May 3, 1932.    W. T. BIRDSALL    1,856,234
VIEW CHANGING APPARATUS
Filed Dec. 15, 1926    3 Sheets-Sheet 2
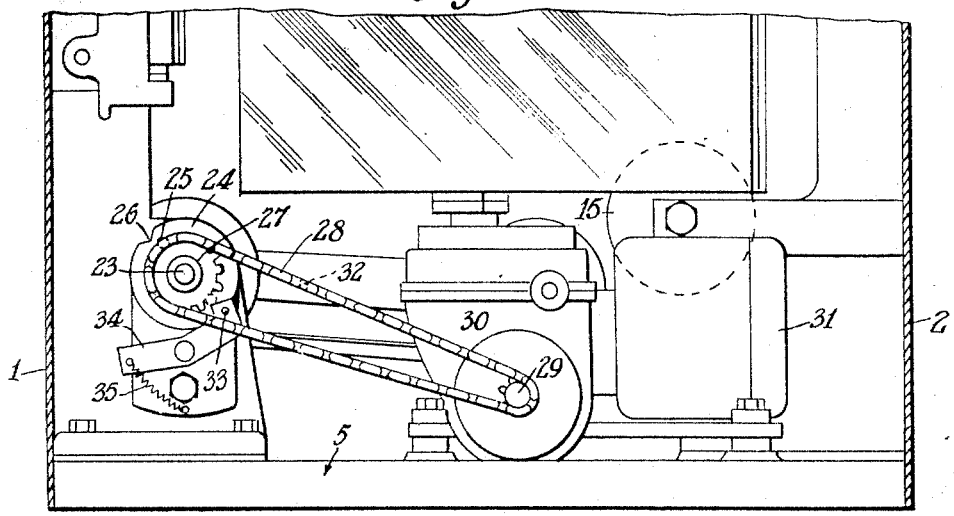
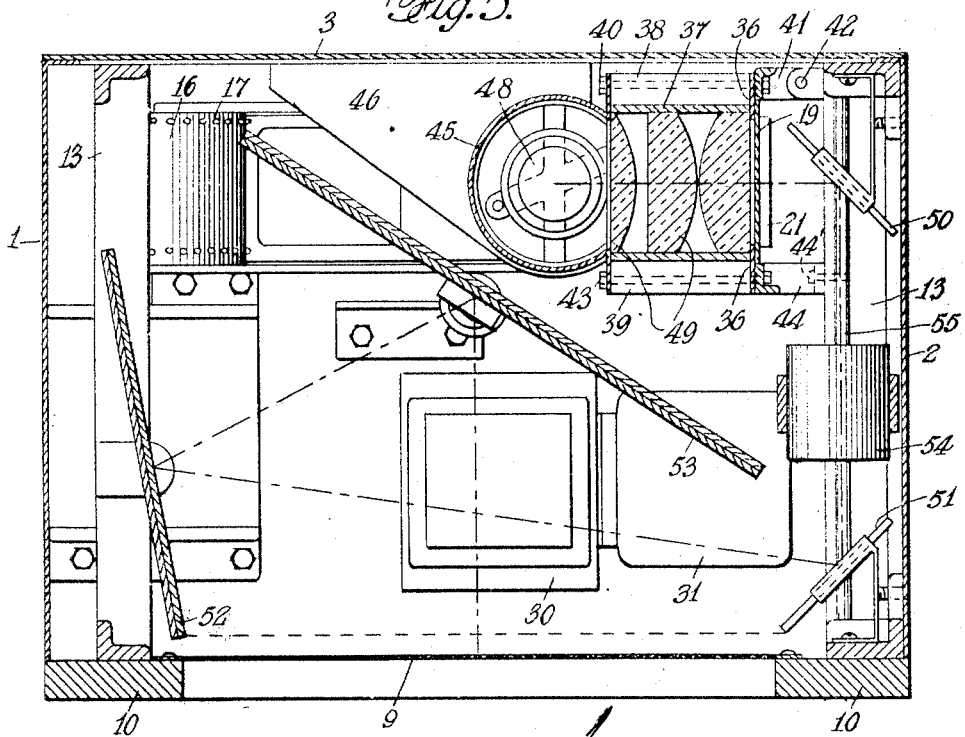

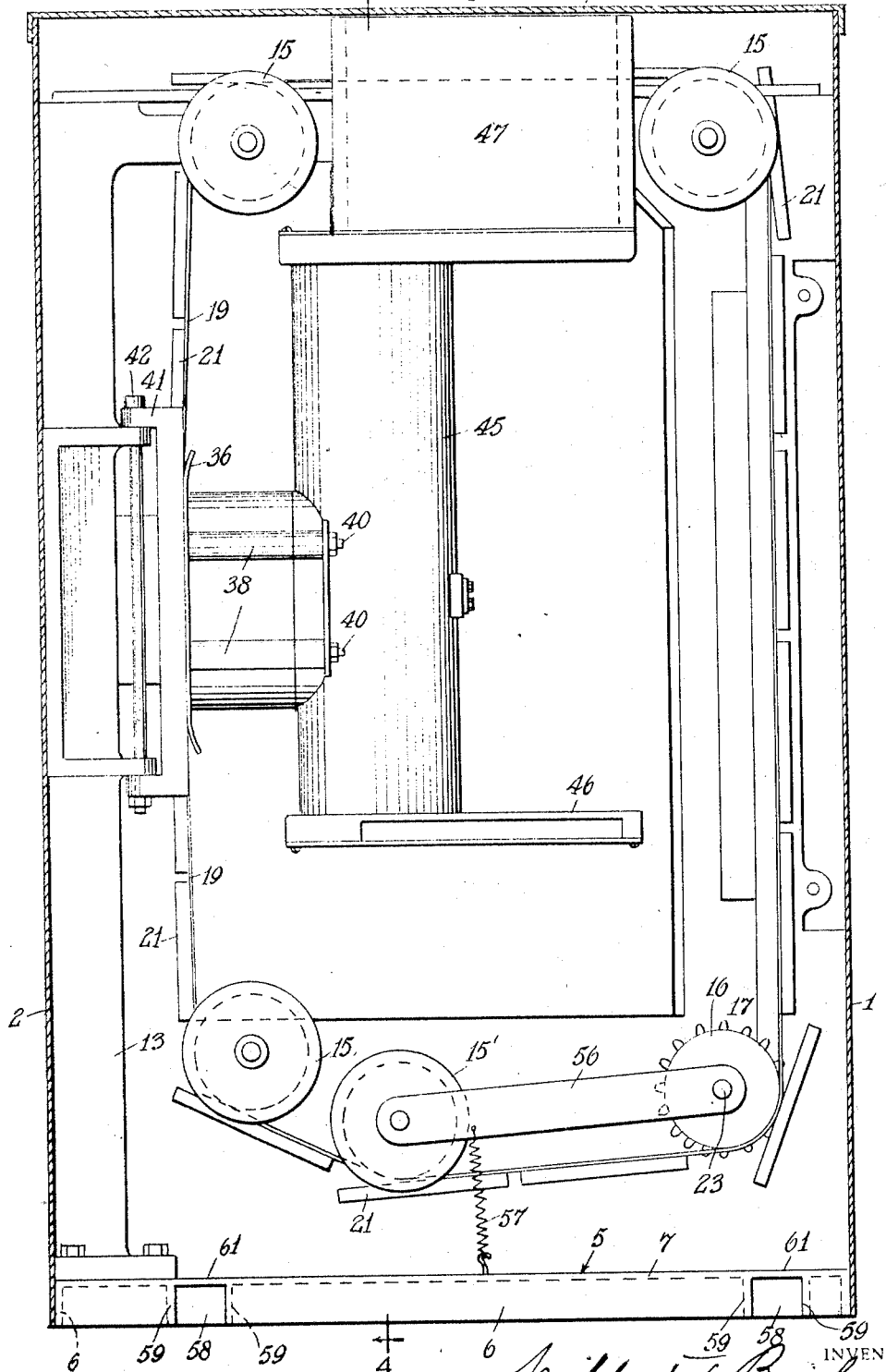

May 3, 1932. W. T. BIRDSALL 1,856,234
VIEW CHANGING APPARATUS
Filed Dec. 15, 1926 3 Sheets-Sheet 3
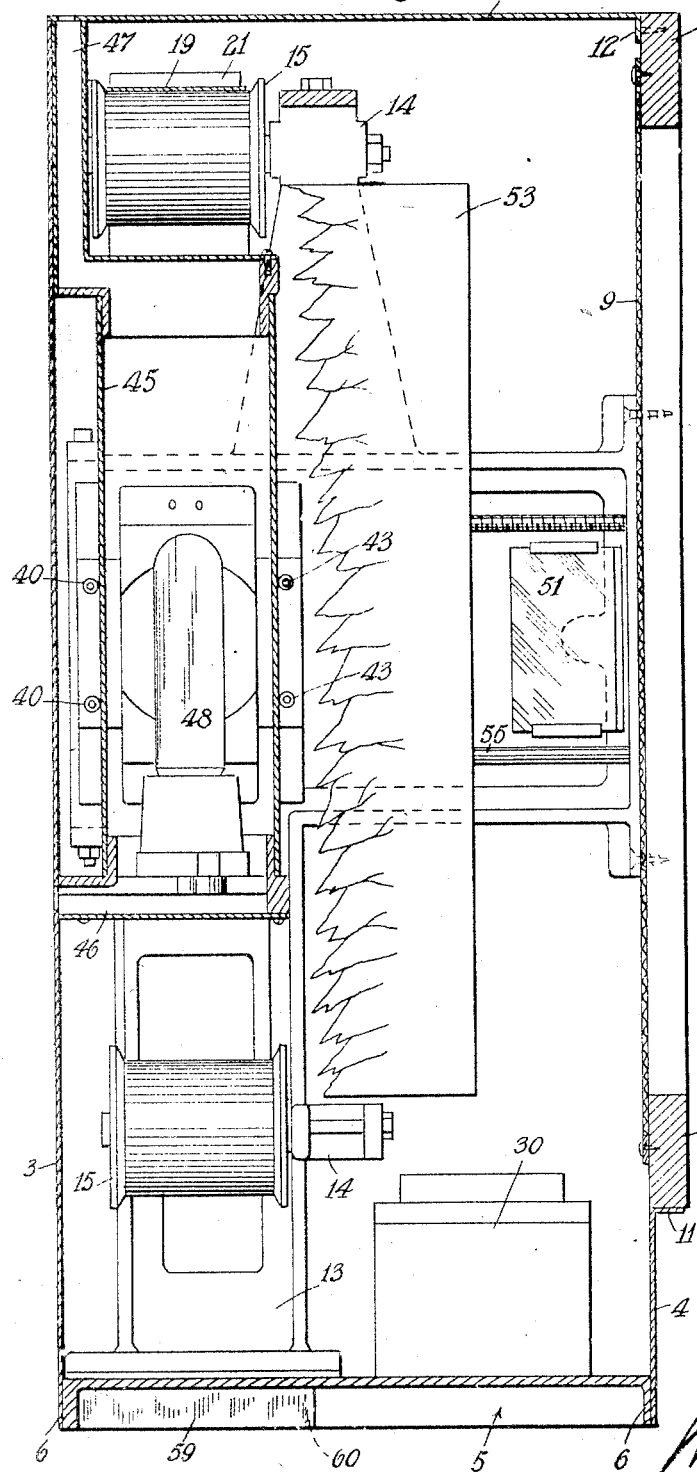

Patented May 3, 1932

1,856,234

UNITED STATES PATENT OFFICE

WILFRED T. BIRDSALL, OF MONTCLAIR, NEW JERSEY, ASSIGNOR TO TRANS-LUX DAYLIGHT PICTURE SCREEN CORPORATION, OF NEW YORK, N. Y., A CORPORATION OF DELAWARE

VIEW CHANGING APPARATUS

Original application filed June 8, 1926, Serial No. 114,404. Divided and this application filed December 15, 1926. Serial No. 154,872.

This application is a division of my copending application, Serial No. 114,404, filed June 8, 1926.

This invention relates to a projector employing a view-changing apparatus and more particularly to that type in which the entire projecting apparatus is contained within a suitable case and in which the image is projected from an object upon a translucent screen forming a wall of the casing. Such projectors are usually employed in advertising or for other purposes where they are started in operation and left to run for a long period of time without supervision of an operator. It is therefore essential that they shall require as little attention as possible so as to cut down the amount of service charge to a minimum. It is also essential that they be so constructed as to be easily adjusted or repaired when the necessity occurs.

Therefore, it is the principal object of my invention to provide a view-changing apparatus which may be embodied in a projector of the type referred to above and which shall accurately operate to present a series of views before a projection position without the necessity of constant attention.

Another and more specific object of my invention is to provide a conveyor adapted to carry a plurality of slides and which shall maintain the slides in correct position in respect to one another and which may be readily removed from the projector casing without the necessity of disarranging the optical system or operating parts.

Another object of my invention is to provide a base for a projector which may be readily altered so as to permit the use of the projector with a conveyor of great length.

Still further objects will become apparent during the description of the selected embodiment of my invention shown in the accompanying drawings, in which:

Figure 1 is an elevation of the back of a projector constructed according to my invention, the back wall of the casing being removed in order to better show the parts.

Figure 2 is a fragmentary elevation of the front of the projector shown in Figure 1, the front wall of the casing being removed.

Figure 3 is a horizontal sectional view through the projector showing the relation of the various parts of the optical system.

Figure 4 is a section on the line 4—4 of Figure 1.

Figure 5 is a face view of a portion of a conveyor constructed according to my invention.

Figure 6 is a section on the line 6—6 of Figure 5.

Figure 7 is a view corresponding to Figure 5 but showing the conveyor without the slide holder attached thereto.

Referring now to the drawings in detail, I have shown my invention as embodied in a projector enclosed within a casing having the side walls 1 and 2, the rear wall 3 and the front wall 4. These walls are preferably secured to a base 5 which may be formed of a casting having the peripheral flanges 6 to support the top 7 of the base a slight distance above the support upon which the casing may rest. The casing is closed at the top by means of the cover 8. Inserted in the front wall 4 is a screen 9 and this screen is translucent so as to permit projection thereon of pictures from slides suitably supported on the interior of the casing. The screen is preferably secured to the rear of a frame 10 and this frame is secured to the wall at the flanges 11 and 12.

Mounted within the casing is a suitable frame 13, which frame is adapted to support the operating parts of the projector. Mounted in suitable bearings 14 are a plurality of shafts carrying rollers 15 and 16. The rollers 15 are idlers while the roller 16 is a sprocket roller, the teeth 17 of which are adapted to engage in perforations 18 adjacent the edges of the conveyor 19 best shown in Figures 5 and 7.

This conveyor comprises a flexible band of sheet material, preferably sheet copper. In projectors of this character, it has been customary to employ various constructions of chain conveyors or to fasten the slides directly to each other. Both of these types of construction are complicated and unsatisfactory in that they make it difficult to obtain proper registration of the slides with the projection aperture. A chain will stretch to such an extent as to make registration impossible without the use of complicated mechanism. This difficulty, however, is avoided by the use of a band of material such as copper, which is practically nonstretchable. Other materials may, of course, be used in place of copper if found satisfactory, but I have found that a copper band is very efficient. The band 19 is provided with a plurality of apertures 20 and registering with these apertures are the slides which may be placed in suitable holders 21. While these holders may be of any suitable construction, I have shown them as being made in the form described and claimed by me in my co-pending application, Serial No. 102,596, filed April 16, 1926. These holders are made of sheet material adapted to be riveted to the conveyor by a pair of centrally disposed rivets 22, one rivet on either side of the holder. By this means the holders are held in proper position on the conveyor and yet form no obstacle to the bending of the conveyor around a roller.

The sprocket roller 16 is secured to the shaft 23, adjacent the rear end thereof. This shaft adjacent its front end carries the disk 24 having a plurality of pins 25 extending from the surface thereof and also provided with a corresponding number of peripheral notches 26. Rotatably mounted on the shaft 23 is the gear 27 meshing with a chain 28 driven from the shaft 29. This shaft is rotated through suitable gearing contained in the gear casing 30 and operated by the motor 31. The chain carries one or more dogs 32 which are adapted to engage one of the pins 25 to give intermittent rotation to the shaft 23.

During the inactive periods the shaft is held in proper position by engagement of a detent 33 in one of the notches 26. This detent is mounted upon a pivoted arm 34 which is urged towards operative position of the detent by means of the spring 35. The above described device furnishes means for intermittently moving the conveyor. The device itself is further described and claimed in my co-pending application, Serial No. 114,407, filed June 8, 1926.

By the intermittent motion of the conveyor the slides in the holders 21 will be successively brought to exposure position. This position is defined by a pair of guides 36, one disposed on each side of the condenser housing 37. The conveyor is adapted to contact with these guides adjacent its edges. By this means the slides carried by the conveyor are presented to the exposure aperture by the guides 36 and properly guided by contact of the flexible conveyor with the guides. The operation of the conveyor is so timed that a slide will be brought to position wherein its center will coincide with the center of the condenser housing during the rest period of the intermittent motion. Thus it will be seen that all the advantages of a flexible film are obtained, combined with the advantages of a series of slides adapted for projection purposes. The flexible conveyor is much more readily handled than is a chain or equivalent structure such as employed by the prior art and by my construction I obtain this ease of handling in a machine for projecting slides.

The condenser housing 37 is provided with a plurality of ribs 38 and 39 on opposite sides thereof. The ribs 38 receive the bolts 40 by means of which the housing is secured to the hinge member 41, this member being hinged at 42 to the frame 13. The ribs 39 carry bolts 43 which secure the condenser housing to the bracket 44 secured to the frame 13 by bolts 44'. The details of the construction of the condenser housing per se are shown and claimed in my co-pending application, Serial No. 114,405, filed June 8, 1926. The condenser housing is connected at its rear end to the lamp house 45 which carries the inlet duct 46 and the discharge duct 47. The openings at the ends of these ducts register with openings in the casing and by this means ventilation of the lamp house is provided.

It will be seen that the duct 47 is offset, as best shown in Figure 4 to provide space for the passage of the conveyor over the lamp house. Similarly the duct 46 is disposed within the path of the conveyor. The lamp 48 is supported within the lamp house by suitable means and it will be seen that as the conveyor is operated to successively register the slides thereon with the projection aperture, the light from the lamp will pass through the condenser formed of the lenses 49 and will be deflected by the mirrors 50, 51, 52 and 53 to the screen 9. The center line of the beam of light is indicated in Figure 3. A suitable objective 54 is disposed between the mirrors 50 and 51 and is slidably mounted on the rod 55 for adjustment.

The conveyor is endless and it will be seen that it is mounted upon single bearings disposed on the side of the rollers away from the back wall. Therefore the back wall may be removed and the lamp house may be swung outwardly and then the conveyor may be lifted off the rollers. The lamp house is normally held in position by means of the bolts 44' and when these are removed the lamp house may be swung on its hinge 42.

To further facilitate removal of the conveyor I mount one roller 15' on a pivoted arm 56 which tensions the conveyor by aid of the spring 57. The conveyor is provided with sufficient slack so that when the roller 15' is lifted the conveyor may be removed with ease. The arrangement of the lamp house and condenser housing within the path travelled by the conveyor makes for an economy of space.

Referring now particularly to Figures 1 and 4, it will be seen that the base is provided with the peripheral flange 6 as described above. It may be found desirable to support the casing upon a hollow pedestal or other container and to have the conveyor of greater length than that shown, the conveyor extending downwardly into the container. When such a use of the projector is contemplated a new base would become necessary, but to avoid the necessity of an additional base I have provided recesses 58 formed by side walls 59 and rear wall 60. It will be noted that the side walls 59 are joined to the peripheral flange 6 and therefore the flange 6 and walls 59 and 60 form in effect one complete flange. It will also be noted that the recesses 58 are disposed beneath the vertical stretches of the conveyor and therefore, when a longer conveyor is to be used, all that is necessary is to cut out the portions 61 of the top 7 of the base between the walls 59 and 60. Then the conveyor may be extended downwardly through the recesses 58 and into any suitable container disposed beneath the base. The base will still have a continuous peripheral flange.

Referring to Figure 1, it will be seen that the two rollers 15 shown at the left of that figure are disposed rearwardly of the guides 36 to such an extent that the conveyor 19 is stretched across the guides and thus preserved taut. This insures that the slide which is brought to rest in the projection aperture will be correctly disposed with respect to the projection system and it also prevents lateral movement thereof during projection.

While I have shown my invention as applied to a specific embodiment, I do not intend to limit myself thereto. I am aware that various changes may be made without departing from the spirit of my invention and therefore I do not intend to limit myself except by the appended claims.

I claim:

1. In a projector, a conveyor formed of an endless band of sheet material having a plurality of apertures therein, a slide holder for each one of said apertures, each holder being secured to said conveyor at points substantially intermediate the length of the apertures in the direction of its movement.

2. In a projector, a conveyor formed of an endless band of sheet copper having a plurality of apertures therein and a plurality of rigid slide holders secured to said conveyor transversely at intermediate points thereof, each slide registering with one of said apertures.

3. In a projector, a projection aperture defined by parallel guides on opposite sides thereof, an endless band of opaque sheet material having its borders adapted to contact with said guides and having a plurality of apertures therein, and rigid slides carried by said band and each registering with one of said apertures and secured to the conveyor at transversely aligned points intermediate the slides.

4. In a projector, a conveyer formed of an endless band of sheet material having a plurality of apertures therein, a plurality of slides and means whereby said slides are oscillatably secured to said conveyer in registering relation with said apertures, respectively.

In testimony whereof, I have affixed my signature to this specification.

WILFRED T. BIRDSALL.